United States Patent [19]

Langley et al.

[11] Patent Number: 4,801,634

[45] Date of Patent: Jan. 31, 1989

[54] PRODUCTION OF PIGMENTARY COPPER PHTHALOCYANINE

[75] Inventors: Robert Langley, Glasgow, Scotland; John D. Stewart, Kempton Park, South Africa; Arthur S. Walls, Kilmarnock, Scotland

[73] Assignee: Ciba-Geigy Corporation, Ardsley, N.Y.

[21] Appl. No.: 64,730

[22] Filed: Jun. 22, 1987

Related U.S. Application Data

[62] Division of Ser. No. 871,932, Jun. 9, 1986, Pat. No. 4,694,078.

[30] Foreign Application Priority Data

Jun. 20, 1985 [GB] United Kingdom ................ 8515600

[51] Int. Cl.$^4$ .......................... C08K 5/34; C08L 27/06
[52] U.S. Cl. ........................................ 524/88; 524/567
[58] Field of Search ...................... 524/88; 106/288 Q

[56] References Cited

U.S. PATENT DOCUMENTS 3,984,433 10/1976 Spietschka ............................. 524/88
4,141,904 2/1979 Cabut ..................................... 540/123
4,171,309 10/1979 Wheeler ................................. 540/132

FOREIGN PATENT DOCUMENTS 1508856 4/1978 United Kingdom .
1558663 1/1980 United Kingdom .

Primary Examiner—John C. Bleutge
Assistant Examiner—David Buttner
Attorney, Agent, or Firm—Luther A. R. Hall

[57] ABSTRACT

Pigmentary copper phthalocyanine is prepared by converting crude copper phthalocyanine by methods known per se in the presence of trichlorophenoxy copper phthalocyanine. The resulting pigment is heat resistant and solvent resistant.

4 Claims, No Drawings

PRODUCTION OF PIGMENTARY COPPER PHTHALOCYANINE

This is a divisional of application Ser. No. 871,932, filed on June 9, 1986, now U.S. Pat. No. 4,694,078, issued on Sept. 15, 1987.

The present invention relates to the production of stabilised pigmentary copper phthalocyanine (CuPc).

GB 1558663 describes a process for the direct synthesis of pigmentary CuPc comprising adding a catalyst and/or crystal form controller from the beginning of the reaction. In the case of α-CuPc this may be inter alia, 1,2,4-trichloro-3-phenoxy CuPc. This compound is always present from the beginning of the reaction used to produce CuPc and pigmentary CuPc is obtained directly without the need for acid pasting or mechanical pulverisation.

In most cases however, which do not use the above direct synthesis method, crude CuPc is produced which then has to be converted into pigmentary CuPc.

Pigmentary CuPc is normally made from crude CuPc by known methods such as salt milling or acid pasting. Depending on the method used the product is β-CuPc or the less stable α-CuPc. It is not often necessary to stabilise β-CuPc but α-CuPc readily converts to the β-CuPc in some applications if it is not stabilised. Stabilisation is normally carried out by adding chlorinated CuPc. However the amounts of chlorinated CuPc needed cause the red-shade-blue α-CuPc to become greener.

We have now surprisingly found that if crude CuPc is converted to pigmentary CuPc in the presence of trichlorophenoxy CuPc the resulting product is sufficiently heat stable to be used in colouring plastics and sufficiently solvent stable to be useful in colouring paints and inks, and moreover the red-shade-blue of α-CuPc is largely maintained.

The trichlorophenoxy CuPc used in the present invention is not a pure compound. It is prepared together with CuPc and/or chlorinated CuPc by replacing from 0.5 to 25% by weight of the phthalic anhydride used in the preparation of CuPc or chlorinated CuPc by an equivalent amount of 3,4,6-trichloro-5-phenoxy-2-cyanobenzoic acid alkyl or phenyl ester which may be prepared by the process described in British Patent Specification No. 1382925. Alkyl ester means preferably lower alkyl, e.g. ethyl or especially methyl ester Accordingly the present invention provides a process for converting crude CuPc to pigmentary CuPc by methods known per se wherein 0.5 to 30% by weight based on the weight of CuPc, of trichlorophenocy CuPc, as defined above, is incorporated into the CuPc during processing.

The amount of trichlorophenoxy CuPc used in the process of the invention is preferably from 1-10% by weight.

The CuPc may be unchlorinated or it may contain up to 6%m for example 1-3% chlorine in the 2-position. Preferably the CuPc is unchlorinated.

The converstion of crude CuPc to pigmentary CuPc may be carried out by mixing the crude CuPc with the trichlorphenoxy CuPc and milling the mixture in the presence of a solid particulate grinding aid which is capable of being removed after milling. The solid particulate grinding aid may be an alkali metal or alkaline earth metal salt of a mineral acid such as sodium chloride or calcium chloride. The proportion of grinding aid may be rup to 500% by weight of the CuPc composition.

In addition a proportion of an alkali metal salt of an organic acid within the range of 2.5% to 25% by weight, based on the weight of grinding aid may be present during the grind. A suitable alkali metal salt is sodium acetate.

The product of this process is a stable pigmentary predominantly α-CuPc. If pigmentary β-CuPc is wanted, the grinding may be carried out in the presence of 0.5-10% by weight, based on the weight of CuPc composition, of an organic liquid such as diethylaniline.

The ground material may also be treated with a polar at least partially water miscible, organic liquid such as isopropanol to produce a pigment with the desired particle size and enhanced colouristic properties.

A second process for converting the crude CuPc to pigmentary CuPc is to mix the CuPc with trichlorophenoxy CuPc, dissolve the mixture in or treat with concentrated sulphuric acid and then reprecipitate the CuPc by adding the acid solution or slurry into water.

The amount of concentrated sulphuric acid used may be from 200%-1500% based on the weight of CuPc composition and the process may be carried out at a temperature from 0°-100° C., preferably from 40°-80° C.

If desired a surfactant may be added to the water before addition of the acid solution. A suitable amount of surfactant is 0.5-10% by weight based on the weight of CuPc composition and a suitable surfactant is dodecylbenzene sulphonic acid.

The product of this process is a stable pigmentary α-CuPc. If desired this product may be subjected to milling, e.g. as described above to produce a pigment having a desired particle size.

Alternatively the crude CuPc may be converted to pigmentary CuPc by dissolving in concentrated sulphuric acid and reprecipitating by adding the solution to water. The product is then subjected to milling, e.g. as described above and the trichlorophenoxy CuPc is incorporated during the milling step.

The pigments produced by the present invention are strong and clean. They are sufficiently stable to heat to be suitable for colouring rubber or plastics such as PVC and polyolefines. They are also sufficiently stable to organic solvents to be useful in colouring paints and inks.

Accordingly the present invention also provides a rubber or plastics composition containing, as colourant, a stabilised pigmentary CuPc obtained by the process of the invention.

The present invention also provides a paint or ink composition comprising, as colourant a stabilised pigmentary CuPc obtained by the process of the invention.

The invention is illustrated by the following Examples, in which "parts" are parts by weight.

Example 1

7.5 parts of phthalic anhydride, 1.45 parts of cuprous chloride and 13.3 parts of urea are charged to a stirred reactor containing 23.3 parts orthonitrotoluene 0.05 parts ammonium molybdate and 1.55 parts of 3,4,6-trichloro-5-phenoxy-2-cyanobenzoic acid methyl ester.

The temperature of the reaction is raised to 165°-170° C. over 4 hours and held at that temperature until the end of the reaction.

The reaction mass is then transferred to a second stirred vessel containing 27.3 parts water, 4.3 parts sodium hydroxide solution (47% w/w), 0.16 parts sulphonated castor oil and 0.25 parts alkyl phenol ethoxylate. The solvent is steam distilled off.

The vessel contents are then filtered and washed alkali free. The filter cake is reslurried in 40 parts of a 10% w/w hydrochloric acid solution, filtered, washed acid free and the filter cake dried off giving a yield of 7.5 parts crude CuPc containing 31.4 mole % (38.0% w/w) of trichlorophenoxy CuPc.

The following composition is milled in a 1 litre vibration mill containing 12 mm steel balls:

24.2 parts of crude CuPc 1.3 parts of crude CuPc containing 38% w/w trichlorophenoxy-CuPc prepared as above.

57.5 parts of sodium chloride 13.0 parts of anhydrous calcium chloride 4.0 parts of anhydrous sodium acetate After milling the charge is added to an acid solution containing 500 parts water, 30 parts concentrated hydrochloric acid, heated to 60° C. and stirred for 30 minutes.

The slurry is then filtered and the filter cake washed free from acid and salt with water and then dried at 60° C.

Test 1

0.5 parts of pigment prepared as described above is premixed vigorously by hand with 5 parts titanium dioxide and 100 parts PVC compound premix consisting of 63 parts Emulsion grade PVC resin K-Value 72–74, 1.5 parts barium/cadmium stabiliser and 35.5 parts plasticiser premix (90% w/w bis-2-ethylhexyl phthalate, 8.5% w/w epoxidised soyabean oil stabiliser, 1.5% w/w suitable chelating agent). The mix is charged to a 2 roll mill preset and stabilised at 150° C./110° C. and milled for 8 minutes.

The PVC sheet so prepared is compression moulded at 160° C.

The resultant pressed PVC sheet is of blue colouring with a strong red shade.

Test 2

0.5 parts of pigment produced as above is thoroughly dispersed in 1 part of the plasticiser bis-2-ethylhexyl phthalate and the resultant plasticised dispersion heated in a 180° C. oil bath for 10 minutes.

A further dispersion is prepared in exactly the same manner but is not subjected to heating.

In both cases 0.188 parts of this dispersion, prepared as described, is vigorously premixed by hand with 1 part titanium dioxide and 100 parts of PVC compound premix as described in Test 1. The mix is charged to a 2 roll mill, compounded and compression moulded as in Test 1.

The resultant pressed PVC sheet in each case is of blue colouring with a strong red shade there being little or no difference in shade or strength between the two sheets.

If however the original pigment is made without the incorporation of the trichlorophenoxy CuPc then the PVC sheet prepared from the plasticiser dispersion which as been subjected to heat has a blue colouring which is of significantly greener shade and/or weaker than the blue colour of the PVC sheet prepared from the plasticiser dispersion not subjected to heat.

Examples 2–7

Example 1 is repeated but the mill charge modified as follows:

| Material | Ex. 2 | Ex. 3 | Ex. 4 | Ex. 5 | Ex. 6 | Ex. 7 |
| --- | --- | --- | --- | --- | --- | --- |
| Crude CuPc | 20.9 | 12.2 | — | 37.9 | 18.5 | 18.5 |
| Crude CuPc 2% chlorinated | — | — | 20.1 | — | — | — |
| Crude CuPc containing 38% w/w trichlorophenoxy CuPc | 7.4 | 13.4 | 5.8 | 2.1 | 1.0 | 1.0 |
| Sodium Chloride | 68.0 | 57.4 | 70.1 | 33.4 | 23.1 | 23.1 |
| Calcium Chloride (Anhydrous) | — | 13.0 | — | 20.0 | 23.1 | — |
| Sodium Acetate (Anhydrous) | 3.7 | 4.0 | 4.0 | 6.6 | — | — |
| Calcium Chloride (Hydrated) | — | — | — | — | — | 23.1 |

0.4 parts of the pigment produced in Examples 2–4 and 0.5 parts of titanium dioxide are charged into a 2 roll mill along with 100 parts high density polyethylene and milled long enough and a high enough temperature to produce a polyethylene hide which is stripped from the mill and chipped. The chipped material is then fed to an injection moulder with the barrel set at 200° C. Once the feed is running uniformly through the machine a high density polyethylene moulding is obtained which is of blue colouring with a strong red shade. This moulding is used for control purposes in assessing heat stability. The procedure is repeated several times with the barrel temperature being increased in steps of 20C deg. at a time.

The strong red shade of blue is maintained to a significantly higher temperature than if the pigment used is prepared as in any of examples 2–4 but without the incorporation of trichlorophenoxy CuPc.

The pigments produced in Examples 5–7 are incorporated into PVC by the methods described in Example 1 and produce similar results.

Example 8

87 parts by weight crude CuPc and 13 parts by weight of crude CuPc containing 38% w/w/ trichlorophenoxy CuPc, prepared as in example 1, are dissolved in 1000 parts 98% sulphuric acid at 60° C. The solution is poured into 10,000 parts vigorously agitated water at room temperature containing 5 parts dodecylbenzenesulphonic acid. After stirring for 0.5 hours the suspension is filtered and the filter cake washed free from acid with water and dried at 60° C.

3 parts of sulphur are milled into 200 parts of natural rubber stock banded on a 2 roll mill preset at 35° C./30° C. 1 part of pigment produced as above is incorporated. The resulting sheet is subsequently compression moulded at 150° C.

The resultant pressed rubber is of blue colouring with a strong red shade.

Example 9

29 parts of crude CuPc, 45 parts of crude chlorinated CuPc containing 2% chlorine and 26 parts of crude CuPc containing 38% w/w trichlorophenoxy CuPc prepared as in example 1 are dissolved in 1000 parts 98% sulphuric acid at 60° C. The solution is poured into 10,000 parts vigorously agitated water at room temperature containing 5 parts dodecylbenzene sulphonic acid. After stirring for 0.5 hours the suspension is filtered and the filter cake washed free from acid with water and dried at 60° C.

The pigment so produced gives similar results in high density polyethylene to those of Examples 2–4.

Example 10

100 parts crude CuPc are added to a suitable vessel containing 364 parts 70% w/w sulphuric acid at 20° C. and the vessel contents then agitated for 3 hours.

1000 parts water are then added to the vessel and the contents temperature raised to 90° C. The suspension is then filtered and the filter cake washed acid free with water, then with an ammonia solution consisting 3.3 parts concentrated ammonia, 33% w/w, and 660 parts water. The filter cake is further washed with hot water until it is sulphate free and is then dried at 100%C.

The pigmentary CuPc so obtained is then milled in a 178 liter ball mill containing 38 mm steel balls with the following being charged to the mill:
100 parts: pigmentary CuPc prepared as above
8 parts: crude CuPc containing 38% w/w trichlorophenoxy CuPc prepared as in Example 1
253 parts: sodium chloride
15 parts: sodium acetate (anhydrous)

After milling the ball mill charge is processed as in Example 1.

50 parts of the pigment prepared as above are ball milled into 100 parts glycerol coconut alkyd/xylene mixture (60% solids) dissolved in 257 parts of a 3:1 xylene:butanol mixture. After dispersion a further 271 parts of glycerol coconut alkyd/xylene mixture together with 157 parts of iso butylated melamine formaldehyde resin (60% solids in iso-butanol) are added to the mill and the contents allowed to homogenise by further milling to produce a blue stainer.

A white reduction is prepared by mixing 5 parts of the above blue stainer with 25 parts of a standard white alkyd melamine formaldehyde paint such that the ratio of organic to inorganic pigment is 1:25. The product gives a strong red shade of blue.

Example 11

Example 1 is repeated but the mill charge is modified as follows to give a predominantly β-CuPc product:
35.0 parts of crude CuPc
2 parts of crude CuPc containing 38% w/w of trichlorophenoxy CuPc prepared as in Example 1
68.5 parts of anhydrous calcium chloride
4.6 parts of sodium acetate crystals
2.0 parts of diethylaniline The product incorporated into PVC by the method described in Example 1. The resulting sheet is of blue colouring with the green shade of β-CuPc.

Example 12

6.11 parts of phthalic anhydride, 1.45 parts of cuprous chloride and 13.3 parts of urea are charged to a stirred reactor containing 23.3 parts orthonitrotoluene, 0.05 parts ammonium molybdate and 4.90 parts of 3, 4, 6-trichloro-5-phenoxy-2-cyanobenzoic acid methyl ester.

The temperature of the reaction is raised to 165°–170° C. over 4 hours and held at that temperature until the end of the reaction.

The reaction mass is then transferred to a second stirred vessel containing 27.3 parts water, 4.3 parts sodium hydroxide solution (47% w/w), 0.16 parts sulphonated castor oil and 0.25 parts alkyl phenol ethoxylate. The solvent is steam distilled off.

The vessel contents are then filtered and washed alkali free. The filter cake is reslurried in 40 parts of a 10% w/w hydrochloric acid solution, filtered, washed acid free and the filter cake dried off giving a yield of 9.1 parts of crude trichlorophenoxy CuPc.

The following composition is milled in a 1 litre vibration mill containing 12 mm steel balls:
24.0 = parts of crude CuPc
0.5 = parts of crude trichlorophenoxy-CuPc prepared as above
57.5 = parts of sodium chloride
13.0 = parts of anhydrous calcium chloride
4.0 = parts of anhydrous sodium acetate After milling the charge is added to an acid solution containing 500 parts water, 30 parts concentrated hydrochloric acid, heated to 60° C. and stirred for 30 minutes.

The slurry is then filtered and the filter cake washed free from acid and salt with water and dried at 60° C.

The pigment is incorporated into PVC by the methods described in Example 1 and produces similar results.

Example 13

8.1 parts of phthalic anhydride, 1.45 parts of cuprous chloride and 13.3 parts of urea are charged to a stirred reactor containing 23.3 parts orthonitrotoluene, 0.05 parts ammonium molybdate and 0.10 parts of 3, 4, 6-trichloro-5-phenoxy-2-cyanobenzoic acid methyl ester.

The temperature of the reaction is raised to 165°–170° C. over 4 hours and held at that temperature until the end of the reaction.

The reaction mass is then transferred to a second stirred vessel containing 27.3 parts water, 4.3 parts sodium hydroxide solution (47% w/w), 0.16 parts sulphonated castor oil and 0.25 parts alkyl phenol ethoxylate. The solvent is steam distilled off.

The vessel contents are then filtered and washed alkali free. The filter cake is reslurried in 40 parts of a 10% w/w hydrochloric acid solution, filtered, washed acid free and the filter cake dried off giving a yield of 6.8 parts crude CuPc containing 2.0 mole % (2.7% w/w) of trichlorophenoxy CuPc., The following composition is milled in a 1 litre vibration mill containing 12 mm steel balls:
19.48 = parts of crude CuPc containing 2.7% w/w trichlorophenoxy-CuPc prepared as above.
23.05 = parts of sodium chloride
23.05 = parts of anhydrous calcium chloride After milling the charge is added to an acid solution containing 500 parts water, 30 parts concentrated hydrochloric acid, heated to 60° C. and stirred for 30 minutes.

The slurry is then filtered and the filter cake washed free from acid and salt with water and dried at 60° C.

The pigment is incorporated into PVC by the methods described in Example 1 and produces similar results.

Example 14

Example 11 is repeated except that the trichlorophenoxy CuPc charge to the mill is as follows:
1.5 parts of crude trichlorophenoxy - CuPc prepared as in Example 12.

The product is incorporated into PVC by the Test 2 method described in Example 1. The resultant pressed PVC sheet in each case is of blue colouring with the green shade of β-CuPc, there being little or no difference in shade or strength between the two sheets.

If however the original pigment is made without the incorporation of trichlorophenoxy CuPc then the PVC sheet prepared from the plasticiser dispersion which has been subjected to heat has a blue colouring which is significantly weaker than the blue colour of the PVC sheet prepared from the plasticiser dispersion not subjected to heat.

Example 15

Example 14 is repeated but after milling, the mill contents are charged to 400 parts of the liquid azeotrope of isopropyl alcohol and water, the slurry is heated to reflux temperature and the mass refluxed for 4 hours. 450 parts of water are added, the mass is reheated to distillation temperature and the solvent distilled off. Concentrated hydrochloric acid is then added until the pH of the slurry is less than 1 and the mass stirred for 30 minutes at 60° C. The slurry is then filtered and the filter cake washed free from acid and salt with water and then dried at 60° C.

The pigment produced is incorporated into PVC in Example 14 with similar results.

We claim:

1. A pigmented composition which comprises
   (a) a rubber or plastic, and
   (b) an effective pigmenting amount of a copper phthalocyanine (CuPc) pigment prepared by converting crude CuPc to pigmentary CuPc by salt milling, solvent treatment or acid pasting in the presence of 0.5 to 30% by weight, based on the weight of crude CuPc, of crude trichlorophenoxy CuPc, obtained together with CuPc and chlorinated CuPc by replacing from 0.5 to 25% by weight of the phthalic anhydride used to prepare CuPc or chlorinated CuPc by an equivalent amount of 3,4,6-trichloro-5-phenoxy-2-cyanobenzoic acid alkyl or phenyl ester.

2. A composition according to claim 1 where in the pigment of component (b) the amount of trichlorophenoxy CuPc is from 2 to 10% by weight.

3. A pigmented composition which comprises
   (a) a rubber or plastic, and
   (b) an effective pigmenting amount of a copper phthalocyanine (CuPc) pigment prepared by (i) first converting crude CuPc into pigmentary form by dissolving in acid and then precipitating in water, and then (ii) milling the precipitate from step (i) in the presence of 0.5 to 30% by weight, based on the precipitate from step (i), of crude trichlorophenoxy CuPc to convert the mixture of pigments into the heat-stable pigmentary form.

4. A pigmented composition which comprises
   (a) a rubber or plastic, and
   (b) an effective pigmenting amount of a copper phthalocyanine (CuPc) pigment prepared by mixing crude CuPc with 0.5 to 30% by weight, based on the crude CuPc, of crude trichlorophenoxy CuPc, and then subjecting the mixture of crude pigments to salt milling or to acid pasting to convert the crude pigments into the heat-stable pigmentary form.

* * * * *